(12) United States Patent
Deng et al.

(10) Patent No.: US 11,226,617 B2
(45) Date of Patent: Jan. 18, 2022

(54) REMOTE CONTROL

(71) Applicant: SZ DJI TECHNOLOGY CO., LTD., Shenzhen (CN)

(72) Inventors: Yumian Deng, Shenzhen (CN); Wenbo Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/792,243

(22) Filed: Feb. 16, 2020

(65) Prior Publication Data

US 2020/0183381 A1    Jun. 11, 2020

Related U.S. Application Data

(63) Continuation of application No. PCT/CN2017/097903, filed on Aug. 17, 2017.

(51) Int. Cl.

| G05D 1/00 | (2006.01) |
| B64C 39/02 | (2006.01) |
| G05D 1/10 | (2006.01) |
| G08C 17/02 | (2006.01) |
| H04N 5/225 | (2006.01) |
| H04N 5/232 | (2006.01) |
| A63F 13/24 | (2014.01) |

(52) U.S. Cl.
CPC ......... *G05D 1/0016* (2013.01); *B64C 39/024* (2013.01); *G05D 1/0094* (2013.01); *G05D 1/101* (2013.01); *G08C 17/02* (2013.01); *H04N 5/2253* (2013.01); *H04N 5/23203* (2013.01); *A63F 13/24* (2014.09); *A63F 2300/1043* (2013.01); *G08C 2201/92* (2013.01)

(58) Field of Classification Search
None
See application file for complete search history.

(56) References Cited

U.S. PATENT DOCUMENTS

| 2016/0327389 A1 | 11/2016 | Uzunovic |
| 2016/0334785 A1 | 11/2016 | Morrison |

FOREIGN PATENT DOCUMENTS

| CN | 202844580 U | 4/2013 |
| CN | 203838864 U | 9/2014 |
| CN | 104618405 A | 5/2015 |
| CN | 204350143 U | 5/2015 |
| CN | 204374658 U | * 6/2015 |
| CN | 204374658 U | 6/2015 |
| CN | 105388906 A | 3/2016 |
| CN | 105468024 A | 4/2016 |
| CN | 105469579 A | 4/2016 |

(Continued)

OTHER PUBLICATIONS

The World Intellectual Property Organization (WIPO) International Search Report for PCT/CN2017/097903 dated May 18, 2018 7 pages.

*Primary Examiner* — Heather R Jones
(74) *Attorney, Agent, or Firm* — Anova Law Group, PLLC

(57) ABSTRACT

A remote control, including: a body with a front, a top, and a side; a touch screen disposed on the front; and an operating lever disposed on the front. The front includes an upper edge and a side edge intersecting with the upper edge. The upper edge intersects with the top, and the side edge intersects with the side. The operating lever is located near the upper edge and the side edge.

20 Claims, 11 Drawing Sheets

(56) References Cited

FOREIGN PATENT DOCUMENTS

| CN | 105867422 A | | 8/2016 |
|----|-------------|---|--------|
| CN | 205541399 U | * | 8/2016 |
| CN | 205541399 U | | 8/2016 |
| CN | 205692364 U | | 11/2016 |
| CN | 205849672 U | | 1/2017 |
| CN | 207149060 U | | 3/2018 |
| CN | 207337638 U | | 5/2018 |
| EP | 1602574 A1 | | 12/2005 |

* cited by examiner

REMOTE CONTROL

CROSS-REFERENCE TO RELATED APPLICATION

This application is a continuation of International Application No. PCT/CN2017/097903, filed Aug. 17, 2017, the entire content of which is incorporated herein by reference.

TECHNICAL FIELD

The disclosure relates to the technical field of remote control device, and in particular relates to a remote control.

BACKGROUND

A user may control an unmanned aerial vehicle (UAV) or obtain images by operating a remote control. The obtained images or flight parameters of the UAV may be displayed on the displaying screen of the remote control. Oftentimes, since the location of the control device relative to the displaying screen is not reasonably set, the user needs to move one hand from the remote control or change the holding posture, which is inconvenient to operate and low in comfort.

SUMMARY

In accordance with the disclosure, there is provided a remote control, including: a body with a front, a top, and a side; a touch screen disposed at the front; and an operating lever disposed at the front. The front includes an upper edge and a side edge intersecting with the upper edge. The upper edge intersects with the top, and the side edge intersects with the side. The operating lever is located near the upper edge and the side edge.

Figure 1:
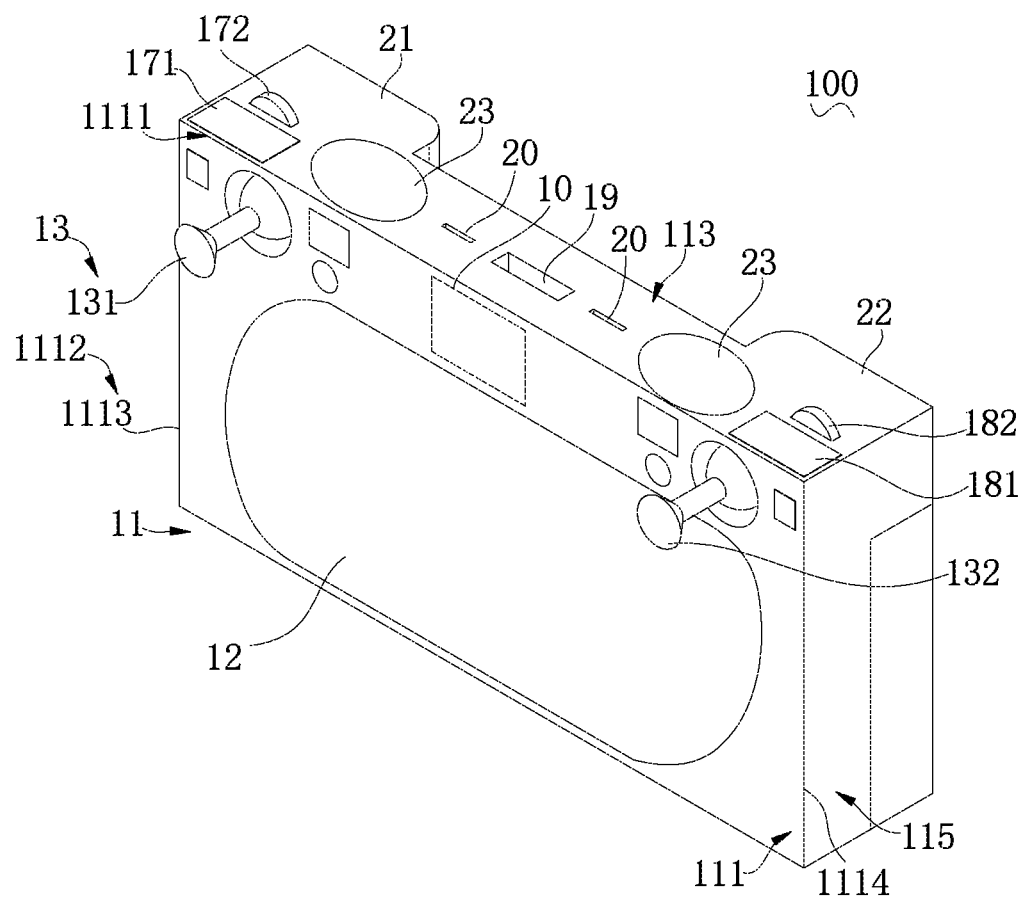
FIG. 1 is a first schematic 3-dimensional diagram of a remote control according to some embodiment of the present disclosure.

Numeral references: remote control 100; GPS 10; body 11; front 111; top edge 1111; side edge 1112; left edge 1113; right edge 1114; back 112; top 113; bottom 114; side 115; left side 1151; right side 1152; protective cover 116; through hole 1161; potentiometer 117; mounting shaft 1172; touch screen 12; operating lever 13; left operating lever 131; operating lever 132; main body 133; connecting portion 134; operating portion 135; middle button 14; left custom button 15; right custom button 16; left top button 17; video button 171; camera control button 172; right top button 18; photo button 181; gimbal adjustment button 182; slot of a card slot 19; interface 20; left grip 21; turning groove 211; right grip 22; top heat dissipation port 23; bottom heat dissipation port 24; antenna 25; sub-antenna 251; end 252; adapting member 26; storage space 27; storage slot 28; fixing bracket 29; left fixing member 30; right fixing member 31; storage box 32; storage slot 321; box cover 322; groove 323.

DETAILED DESCRIPTION OF THE EMBODIMENTS

The embodiments of the present disclosure are further described below with reference to the accompanying drawings. The same or similar reference numerals in the drawings indicate the same or similar elements or elements having the same or similar functions.

In addition, the embodiments of the present disclosure described below with reference to the drawings are exemplary, and are only used to explain the embodiments of the present disclosure, and should not be construed as limiting the present disclosure.

In the present disclosure, unless explicitly stated and defined otherwise, the first feature "above" or "below" the second feature may be that the first feature and the second feature are in direct contact, or that the first feature and the second feature are in indirect contact via an intermediate medium. Moreover, the first feature is "above" the second feature may be that the first feature is directly above or obliquely above the second feature, or it only indicates that a horizontal height of the first feature is greater than the horizontal height of the second feature. The first feature is "below" the second feature may be that the first feature may be directly below or obliquely below the second feature, or it may simply indicate that a horizontal height of the first feature is less than the horizontal height of the second feature.

Figure 2:
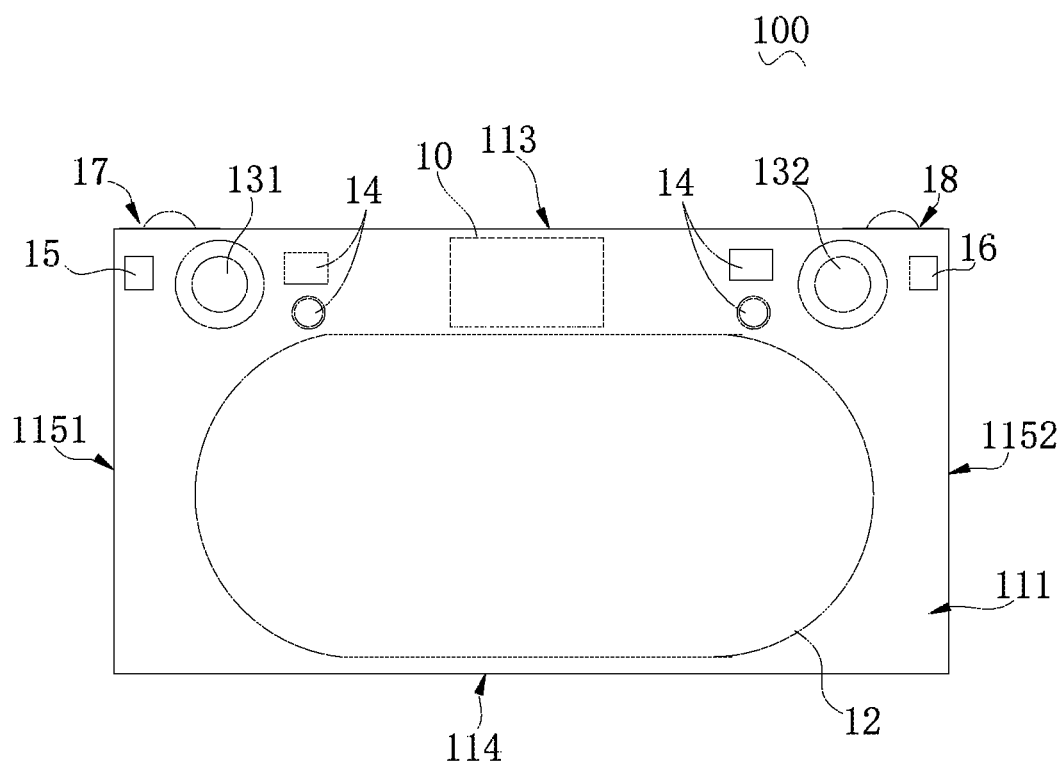
FIG. 2 illustrates a front view of a remote control according to some embodiment of the present disclosure.

Referring to FIGS. 1 and 2, according to some embodiment of the present disclosure, a remote control 100 includes a body 11, a touch screen 12, and an operating lever 13. The body 11 is formed with a front 111, a top 113 and a side 115. The front side 111 includes an upper edge 1111 and a side edge 1112 that intersect with each other. The upper edge 1111 intersects with the top 113, and the side edge 1112 intersects with the side 115. The touch screen 12 is disposed on the front 111. The operating lever 13 is disposed on the front side 111, and the operating lever 13 is located near the upper edge 1111 and the side edge 1112.

In the remote control 100 according to the embodiment of the present disclosure, the position of the operating lever 13 is reasonable, which is convenient for the user to hold the remote control 100 to operate the operating lever 13, and the user can simultaneously view the touch screen 12 and perform operations on the touch screen 12. The user can operate the remote control 100 more conveniently and experience higher comfort.

Specifically, the remote control 100 may be configured to control a UAV, and the UAV may be an unmanned aerial vehicle, an unmanned ship, an unmanned vehicle, etc. The remote control 100 may also be configured to be connected to an electronic device (such as a video game console, etc.) so as to control the electronic device to operate for work or entertainment, etc. In the embodiment of the present disclosure, the remote control 100 is described as an example in which the remote control 100 is configured to control a UAV. It can be understood that an object controlled by the remote control 100 is not limited to the UAV described in the embodiment of the present disclosure, and it is not limited herein.

The remote control 100 can control the flying attitude of the UAV, such as pitch, roll, and yaw; or control the flying mode of the UAV, such as ascending, descending, hovering, flying around, tracking, etc.; or control the flight parameters of the UAV, such as flight speed, acceleration, and flight altitude; or control a flight trajectory of the UAV, such as autonomous flight or manual flight along the trajectory. The UAV may carry an imaging device, and the imaging device may be a camera, etc. The remote control 100 may control the imaging device to obtain images during a flight of the UAV, and the image may be a picture or a video.

The body 11 can be configured as a mounting carrier for functional components of the remote control 100. The functional components may be, for example, a control circuit board, a battery, or a communication module, etc., controlled by the remote control 100. The body 11 can also provide protection for the functional components to avoid interference with a normal use of remote control 100 by external dust, water vapor, etc. The front 111 may be a surface facing the user when holding and using the remote control 100. The upper edge 1111 is connected to the top 113, and the side edge 1112 is connected to the side e 115. That is, the front 111 and the top 113 intersect at the upper edge 1111, and the front 111 and the side 115 intersect at the side edge 1112. At the same time, the upper edge 1111 and the side edge 1112 intersect; that is, the top side 113 and the side 115 also intersect with each other. Since the operating lever 13 is located near the upper edge 1111 and the side edge 1112, in one example, when the user holds the remote control 100, a palm of the user may be opposite to the side 115, a thumb may be used to move the operating lever 13, and an index finger may be placed on the top side 113 to operate the operation buttons on the top 113. When the user operates the remote control 100, the user can experience high comfort and perform all operations without moving either hand from the remote control 100.

The touch screen 12 may be configured to display information obtained by the imaging device and flight parameters of the UAV. The touch screen 12 may also display usage parameters of the remote control 100, such as the battery power, external devices connected to the remote control 100, etc. At the same time, the user can also input operation instructions on the touch screen 12 to adjust the remote control performance of the remote control 100 or control the UAV. Specifically, virtual buttons may be displayed on the touch screen 12, and the user inputs an operation instruction by touching the virtual buttons. Preferably, the virtual button may be disposed near the operating lever 13 so that the user can move his finger from the operating lever 13 to the virtual button.

The operation lever 13 is connected to the body 11. The operating lever 13 protrudes from the front 111 and can rotate relative to the body 11. The user can control the UAV to fly or control the imaging device to record images by moving the operating lever 13. For example, the operating lever 13 can be moved to remotely control a movement direction, the attitude and the speed of the UAV.

Referring to FIGS. 1 and 2, in some embodiments, the side 115 includes a left side 1151 and a right side 1152; the side edge 1112 includes a left edge 1113 and a right edge 1114; and the left edge 1113 intersects with the left side 1151. The right edge 1114 intersects with the right side 1152. The operating lever 13 includes a left operating lever 131 and a right operating lever 132. The left operating lever 131 is near the left edge 1113, and the right operating lever 132 is near the right edge 1114.

Specifically, in the embodiment of the present disclosure, the body 11 is substantially cuboid, the left side 1151 is opposite to the right side 1152, the front 111 and the left side 1151 intersect at the left edge 1113, and the front side 111 and the right side intersect at the right edge 1114. When operated by the user, the palm of the left hand of the user can be opposite to the left side 1151, and the left thumb may control the left operating lever 131 or operate on the touch screen 12; meanwhile, the palm of the right hand can be opposite the right side 1152, and the right thumb may control the right operating lever 132 or operate on the touch screen 12 for user's convenience.

Referring to FIG. 1, in some embodiments, the left operating lever 131 and the right operating lever 132 are located between the upper edge 1111 and the touch screen 12. A size of the touch screen 12 along an extending direction of the upper edge 1111 can be set to be relatively large, so as to increase a screen ratio of the remote control 100 and improve the user's operating experience. In the embodiments of the present disclosure, the touch screen 12 has a rectangular shape. It can be understood that the shape of the touch screen 12 is not limited to the rectangular shape, and may be an elliptical shape, a stadium shape, a circular shape, etc.

In some embodiments, the touch screen 12 is located between the left operating lever 131 and the right operating lever 132. The size of the touch display screen 12 along an extending direction of the side edge 1112 can be set to be relatively large to increase the screen ratio of the remote control 100 and improve the user's operating experience.

In some embodiments, a through hole may be disposed on the touch screen 12, and the left operating lever 131 and the right operating lever 132 pass through the through hole. The through hole passes through the display area of the touch screen 12, and the left operating lever 131 and the right operating lever 132 pass through the through hole, so that the area of the display area can be larger, and the through hole can be a gap disposed on the edge of the touch screen 12. The position of the through hole may also be spaced from the edge of the touch screen 12.

Figure 5:
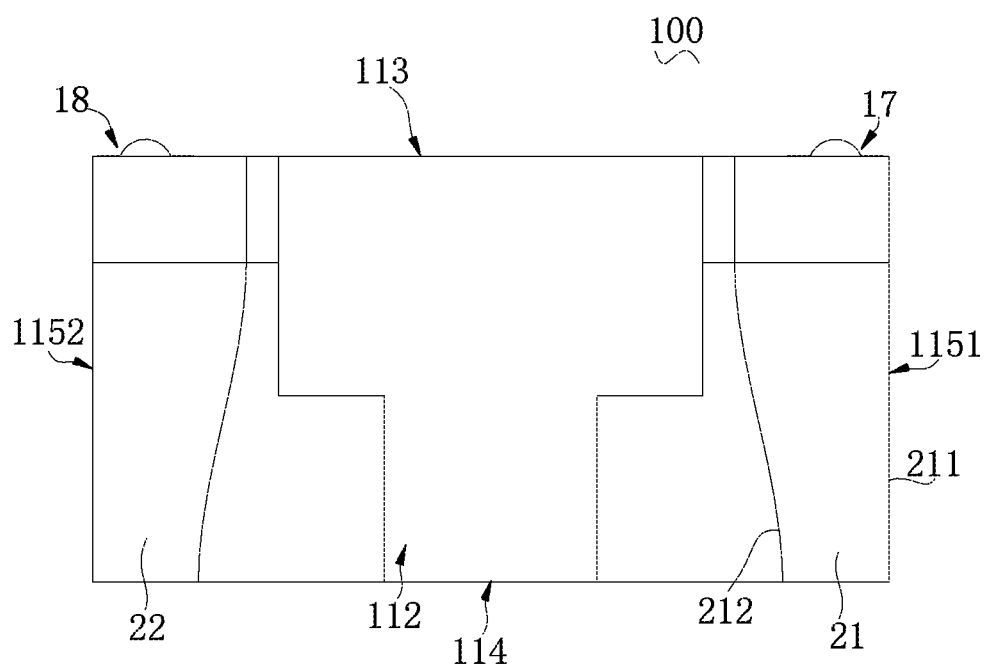
FIG. 5 illustrates a first rear view of a remote control according to some embodiment of the present disclosure.

Referring to FIG. 1 and FIG. 5, in some embodiments, the remote control 100 is formed with a back 113 opposite to the front 111. The remote control 100 further includes a left grip 21 and a right grip 22 which protrude from the back 112 and are spaced apart from each other. The left grip 21 corresponds to the left operating lever 131, and the right grip 22 corresponds to the right operating lever 132.

Specifically, in order to facilitate a carrying of the remote control 100, the remote control 100 is usually designed to be thin and light; that is, the thickness of the body 11 is set to be thin. However, if the thickness of the remote control 100 is too thin, it is not convenient for the user to hold. The left grip 21 and the right grip 22 protruding from the back 112 facilitate a holding of the remote control 100 by the user. In one example, when the user holds the remote control 100, the user's middle finger, ring finger, and little finger all hold a side wall of the left grip 21 or a side wall of the right grip 22, so that when the user operates the remote control 100, the grip can be stable and provides high comfort. Further, a non-slip mat may be disposed on the surface of the left grip 21 or the right grip 22, or the surface of the left grip 21 and the surface of the right grip 22 may be roughened to reduce a chance of the user's slipping of the remote control during use.

Referring to FIGS. 1 and 5, the body 11 is formed with a bottom 114 opposite to the top 113. In a direction from the top 113 to the bottom 114, a width of the left grip 21 gradually decreases, and a width of the right grip 22 gradually decreases.

A shape of the left grip 21 and the right grip 22 is ergonomically designed, and the comfort for the user to hold the remote control 100 is further enhanced. Specifically, one left side wall 211 of the left grip 21 may coincide with the left side 1151, and the left side wall 211 may be a flat wall. The side wall opposite to the left side wall 211 is the right side wall 212. In a direction from the top 113 to the bottom 114, a distance between the right side wall 212 and the left side wall 211 gradually decreases, and the right side wall 212 is a streamlined curved wall.

In other embodiments, in the direction from the top 113 to the bottom 114, the left grip 21 includes both a section having a constant width section and a section having a gradually decreasing width.

A shape and position of the right handle 22 may be symmetrical to the shape and position of the left handle 21, and the shape and position of the right handle 22 are not described herein again.

Referring to FIG. 1 and FIG. 2, in some embodiments, the remote control 100 further includes a global positioning system (GPS) 10 disposed in the body 11. An orthographic projection of the GPS 10 on the front 111 is located between the left operating lever 131 and the right operating lever 132, and also between the touch screen 12 and the upper edge 1111.

The GPS 10 can be configured to locate the remote control 100. When the user operates the remote control 100, the user can be located. In actual applications, the UAV can determine a relative spatial relationship between the UAV and the user based on its own position and the location determined by the GPS 10, and provide a target position when the UAV returns.

It can be understood that, when using the GPS 10, in order to ensure the accuracy of its positioning, it should be avoided as much as possible from being blocked by other mechanical devices or electronic devices. The GPS 10 is disposed in the body 11, and the body 11 can provide protection to the GPS 10. The orthographic projection of the GPS 10 on the front 111 is located between the left operating lever 131 and the right operating lever 132, and is also located between the touch screen 12 and the upper edge 1111. Accordingly, during use, the user's hands are prevented from blocking or affecting the operation of the GPS 10, and the accuracy and reliability of the operation of the GPS 10 can be improved.

Referring to FIG. 1 and FIG. 2, in some embodiments, the remote control 100 further includes a middle button 14 disposed on the front 111. The middle button 14 is located between the left operating lever 131 and the right operating lever 132, and is also located between the touch screen 12 and the upper edge 1111.

In some embodiments, a through hole is disposed in the touch screen 12, and the middle button 14 is disposed in the through hole.

The middle button 14 is disposed on the front 111, which is convenient for the user to operate. Specifically, the middle button 14 is disposed near the left operating lever 131 and the right operating lever 132 to facilitate a switch by the user to the position of the middle button 14 for operation from the operating lever 13. More specifically, the middle button 14 is disposed away from the GPS 10, to prevent the middle button 14 itself from affecting the GPS 10, and to prevent the user's hand from affecting the normal operation of the GPS 10 when the user operates on the middle button 14.

The middle button 14 may be single or plural, and the middle button 14 may be one or more of: a physical button, a lever, a trackwheel, and a knob. For example, the middle button 14 includes a button and a trackwheel; or the middle button 14 includes a knob and a lever; or the middle button 14 includes a button, a lever, and a knob; or the middle button 14 includes a lever, a knob, a button, and a trackwheel. Of course, the specific type of the middle button 14 is not limited to the above-mentioned types, and may also be any other middle button 14 that can receive a user operation instruction.

Referring to FIG. 1 and FIG. 2 again, in some embodiments, the middle button 14 includes one or more of: a home button, a brake button, a power button, and a five-dimensional button. That is, the middle button 14 may include the home button, the brake button, the power button, and the five-dimensional button; or it may include only the home button, the brake button, and the power button; or it may include only the home button and the power button; or it may include only the home button. It should be noted that the combination of the types of the middle button 14 is not limited to the above examples, and there may be combinations of other suitable types.

Specifically, the home button is configured to control the movement of the UAV to a preset position, for example, to control a plant protection spraying UAV to return to the water platform to add water, or to control the UAV to return to the position of the remote control 100. The brake button is configured to control the UAV to stop moving. For example, when the UAV detects an obstacle ahead, the brake button may be triggered to send a braking instruction to the UAV. At this time, the UAV can be hovering for further confirmation of flying direction. The power button is configured to turn on or off the remote control 100. The power button may be a button. When the remote control 100 is turned off, it can be pressed once to turn on the remote control 100. When the remote control 100 is turned on, it can be pressed once to turn off the remote controller 100. The five-dimensional button is configured to control the UAV to record images, for example, to control a rotation of a gimbal mounted on the UAV, or to control the imaging device to switch between different imaging modes.

Referring to FIG. 1 and FIG. 2, in some embodiments, the remote control 100 includes a left custom button 15 and a right custom button 16 disposed on the front 111. The left custom button 15 is located between the left operating lever 131 and the left edge 1113. The right custom button 16 is located between the right operating lever 132 and the right edge 1114.

Specifically, the left custom button 15 is disposed near the left operating lever 131, and the right custom button 16 is disposed near the right operating lever 132, so that the user can transfer his finger from the operating lever 13 to the left custom button 15 or right custom button 16 for operation. Functions of the left custom button 15 and the right custom button 16 can be defined by the user based on actual needs and operating habits. The left custom button 15 and the right custom button 16 can be single or multiple.

Referring to FIG. 2, in some embodiments, the left custom button 15 is configured to switch the motion mode of the UAV, or lock the remote control 100, or start the UAV, or adjust a sensitivity of the operating lever 13. The right custom button 16 is configured to switch the motion mode of the UAV, or lock the remote control 100, start the drone, or adjust the sensitivity of the operating lever 13. In the embodiment of the present disclosure, the left custom button 15 can be configured to switch the flight mode (ascending, descending, hovering, flying around, tracking, etc.) of the UAV, lock the remote control 100 to prevent the remote control 100 from being triggered by mistake, start the UAV with one click to reduce a take-off operation difficulty of the UAV, adjust the sensitivity of the operating lever 13 to adapt to the usage habits of different users, and so on. Similarly, the right custom button 16 can also be configured to switch the flight mode of the UAV, lock the remote control 100 to prevent the remote control 100 from being triggered by mistake, and start the UAV with one click to reduce the take-off operation difficulty of the UAV, adjust the sensitivity of the operating lever 13 to adapt to the usage habits of different users, and so on.

Referring to FIG. 2 again, in some embodiments, the remote control 100 further includes function buttons. The function buttons can be in different operating modes to switch among different control objects. When the left custom button 15 is configured to be triggered with the function buttons at the same time, the switch function buttons are in different operating modes. When the right custom button 16 is configured to be triggered with the function buttons at the same time, the switch function buttons are in different operating modes.

The function buttons can be used in combination with the left custom button 15 or the right custom button 16 in different operating modes, thereby reducing a number of function buttons that need to be set by the remote control 100 and making the structure of the remote control 100 simple. In one example, the function buttons in the operating mode 1 can be configured to adjust a rotation angle of the gimbal mounted on the UAV. When the function buttons and the left custom button 15 (or custom button) are triggered at the same time, the function buttons are in operating mode 2. At this time, the function buttons may be configured to switch the camera mode (such as portrait mode, landscape mode, sports mode, still mode, intelligent auto mode, etc.) of the imaging device carried by the gimbal. Further, when the function buttons, the left custom button 15 and the right custom button 16 are triggered at the same time, the function buttons are in operating mode 3, and at this time, the function buttons may be configured to switch the flight mode of the UAV.

The function buttons may be any buttons disposed on the remote control 100. The specific operating modes of the function buttons and their corresponding functions in the above examples should not be construed as limitations on the function buttons.

Figure 3:
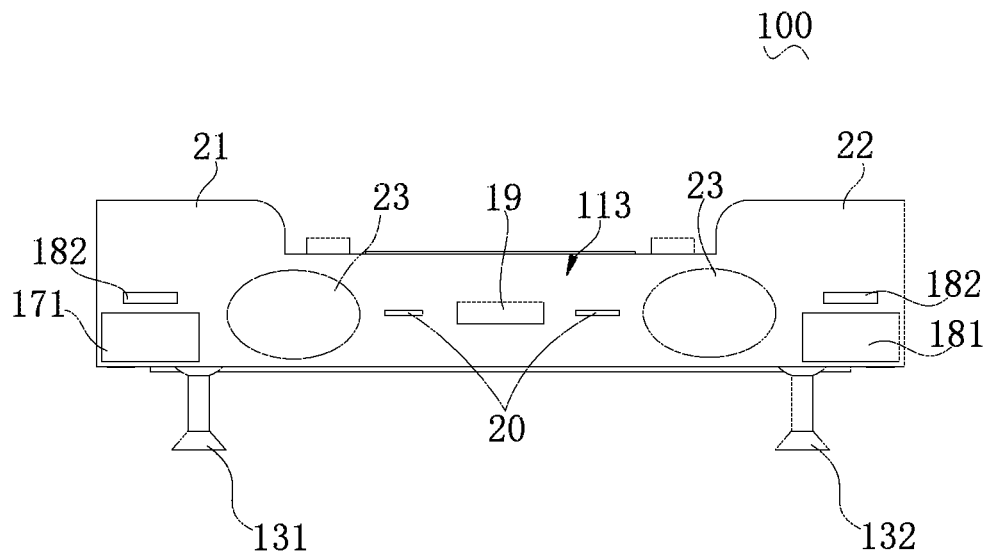
FIG. 3 illustrates a top view of a remote control according to some embodiment of the present disclosure.

Referring to FIGS. 1-3, in some embodiments, the remote control 100 further includes a left top button 17 and a right top button 18 disposed on the top 113. The left top button 17 corresponds to the left operating lever 131 and the right top button 18 corresponds to the right operating lever 132.

The left operating lever 131 is near the left edge 1113; that is, the left operating lever 131 is near the left side 1151. And the left top button 17 corresponds to the left operating lever 131; that is, the left top button 17 is disposed on the top 113 near the left side 1151. When the user holds the remote control 100 with his left hand, the left operating lever 131 and the left top button 17 can be controlled at the same time, and it is not necessary to remove his hand from the left operating lever 131, which enhances the ease and comfort of the user when operating the remote control 100. Similarly, a setting of the right top button 18 corresponding to the right operating lever 132 can also enhance the ease and comfort of the user when operating the remote control 100.

Referring to FIGS. 1-3, in some embodiments, the left top button 17 includes a video button 171 and a camera control button 172. The video button 171 is configured to control a camera carried by the UAV for video recording, and the camera control button 172 is configured to adjust the camera's focus and exposure. The right top button 18 includes a photo button 181 and a gimbal adjustment button 182. The photo button 181 is configured to control the camera to take pictures. The camera is mounted on the UAV by the gimbal, and the gimbal adjustment button 182 is configured to control the rotation of the gimbal.

Specifically, the video button 171 is configured to control the imaging device to record a video when triggered. The video button 171 may be a button that is triggered once to start recording when the recording is not started, and that is triggered once to stop recording during the recording process. The camera control button 172 can be a trackwheel. The camera control button 172 can adjust the focus and exposure of the imaging device when it is scrolled. The trackwheel can adjust the focus and exposure in steps. At this time, the trackwheel can be scrolled and stay at specific angles (such as ninety degrees, sixty degrees, etc.) to maintain a focal length and exposure to be at a specific and spaced value; or the focal length and exposure of the job wheel can be adjusted steplessly, and at this time the trackwheel can be scrolled and stay at any angle, so that the focal length and exposure are maintained at any value within an adjustable range.

The photo button 181 is configured to control the imaging device to obtain pictures when triggered. The photo button 181 may be a button. After the photo button 181 is triggered, it may control the imaging device to obtain one or more pictures. The gimbal adjustment button 182 can be configured to adjust the rotation angle of the gimbal. The gimbal adjustment button 182 can be a trackwheel. The gimbal adjustment button 182 is scrolled to make the gimbal to rotate accordingly. The gimbal adjustment button 182 can adjust the rotation angle of the gimbal stepfully. At this time, the job wheel can be scrolled and stay at specific angles, so that the gimbal can rotate to a certain number of angles and remain; or, the gimbal adjustment button 182 can be configured to adjust the rotation angle of the gimbal in steps. At this time, the job wheel can be scrolled and stay at any angle, so that the gimbal can rotate and remain at any angle within an adjustable range.

The camera control button 172 is disposed near the left side 1151, and the photo button 181 is set near the right side 1152, to facilitate an adjustment of the camera control button 172 by the user with his left hand to adjust the focus and exposure of the imaging device in actual use. The user previews an imaging effect of the imaging device by touching the touch screen 12. When the focus and exposure required by the user are adjusted, the right hand triggers the photo button 181 to obtain the picture, and the left hand and the right hand can collaborate to facilitate fast capture of the picture, to avoid operating the camera control button 172 and the photo button 181 by the same hand and an untimely capture of the picture when switching the operation positions. Likewise, the recording button 171 and the gimbal adjustment button 182 are respectively located near the left side 1151 and the right side 1152, which facilitates a collaborative operation of the recording button 171 and the gimbal adjustment button 182 by the user.

Of course, in some embodiments, the specific functions of the left top button 17 and the right top button 18 may have other types or combinations. For example, the right top button 18 includes a video button 171 and a camera control button 172. The video button 171 is configured to control the camera carried by the UAV to record video. The camera control button 172 is configured to adjust the focus and exposure of the camera. The left top button 17 includes a photo button 181 and a gimbal adjustment button 182. The photo button 181 is configured to control the camera to take pictures. The camera is mounted on the UAV by the gimbal, and the gimbal adjustment button 182 is configured to control the rotation of the gimbal. The specific functions of the left top button 17 and the right top button 18 are preferably set by the user.

Referring to FIG. 1 and FIG. 3. In some embodiments, the remote control 100 further includes a slot of a card slot 19 disposed in the body 11. The groove 19 is configured to hold a data card for reading and writing the data card. The groove 19 is disposed on the top 113 or the bottom 114, and the bottom 14 is opposite to the top 13.

After the data card is inserted into the groove 19, the remote control 100 can perform data exchange with the data card, which expands the functions and storage space of the remote control 100. Specifically, the remote control 100 can read information saved in the data card, e.g., read the map information in the data card. The remote control 100 further processes the map information to automatically generate the flight trajectory of the UAV. The remote control can also write date information into the data card. For example, the remote control 100 may write information of the captured image into the data card, to facilitate the storage and transmission. In one example, when different data cards are inserted, the remote control 100 can identify different users corresponding to different data cards. The remote control 100 adjusts the sensitivity of the buttons and the brightness information of the touch screen 12 based on the historical usage habits of different users, to further improve the convenience of the remote control 100. The groove 19 is disposed on the top 113 or the bottom 114. When the user operates the remote control 100, the data card inserted in the groove 19 cannot be easily touched by the user's hand.

Referring to FIG. 1 and FIG. 3, in some embodiments, the remote control 100 further includes one or more interfaces 20 provided on the body 11. The interface 20 is configured to be connected to an external device to transmit data and/or charge the remote control 100. The interface 20 is disposed on the top 113 and/or the bottom 114, and the bottom 114 is opposite to the top 113.

That is to say, the interface 20 may be disposed on the top 113 alone, or on the bottom 114 alone, or on the top 113 and the bottom 114 at the same time. The interface 20 may be configured to be connected to an external device to transmit data (e.g., to be connected to another remote control 100 to exchange data), or to charge the remote control 100 (e.g., to be connected to a power adapter), or to both transmit data and charge the remote control 100. The specific type of the interface 20 may be a USB interface, a TYPE-C interface, etc. The interface 20 is disposed on the top 113 or the bottom 114. When a user operates the remote control 100, it can be difficult to touch a connection line connected to the interface 20 with his hand.

Referring to FIG. 1 and FIG. 3, in some embodiments, the remote control 100 further includes a top heat dissipation port 23 disposed in the top 113, and the top heat dissipation port 23 is connected to an outside environment and an inside of the body 11.

It can be understood that the functional components disposed in the body 11 generate heat during operation, and the heat can be dissipated from the body 11 to the outside by the top heat dissipation port 23, so that the temperature in the body 11 cannot be too high, and the functional components are guaranteed to operate normally.

Figure 4:
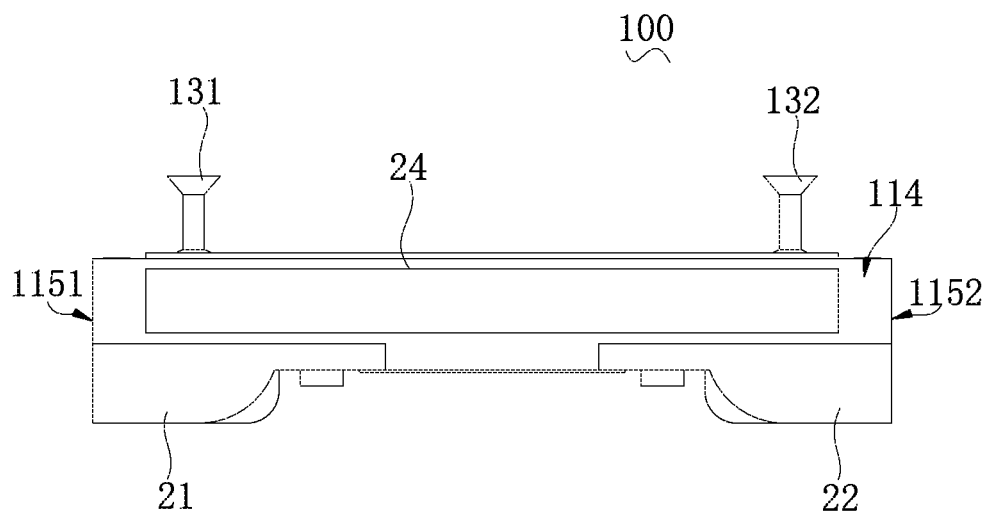
FIG. 4 illustrates a bottom view of the remote control according to some embodiment of the present disclosure.

Referring to FIG. 1, FIG. 3 and FIG. 4, in some embodiments, the remote control 100 further includes a bottom 114 opposite to the top 113. The remote control 100 further includes a bottom heat dissipation port 24 disposed in the bottom 114. The heat dissipation port 24 is connected to the outside environment and the inside of the body 11.

The bottom heat dissipation port 24 can be configured to dissipate heat generated by the functional components to the outside, so as to reduce the temperature inside the body 11. Further, since the top heat dissipation port 23 is disposed in the top 113, the bottom heat dissipation port 24 is disposed in the bottom 114, and the top 113 is opposite to the bottom 114, external air can enter into the body 11 by the top heat dissipation port 23 and flows out of the body 11 from the bottom heat dissipation port 24, so that the airflow in the body 11 is smoother, and the heat dissipation effect in the body 11 is improved. Of course, the airflow can also enter the body 11 from the bottom heat dissipation port 24 and flow out of the body 11 from the top heat dissipation port 23.

Referring to FIG. 1, FIG. 3 and FIG. 4, in some embodiments, the remote control 100 can transmit a sound from the top heat dissipation port 23; or, the remote controller 100 can transmit a sound from the bottom heat dissipation port 24.

Specifically, the remote control 100 may be configured to play music, or to generate a prompt sound. For example, when there is an obstacle in front of the UAV, the remote control 100 may make a "beep" prompt sound to prompt the user. The remote control 100 makes sound through the top heat dissipation port 23 or the bottom heat dissipation port 24, and there is no need to dispose an additional sound port on the body 11, which simplifies the structure of the remote control 100.

Figure 6:
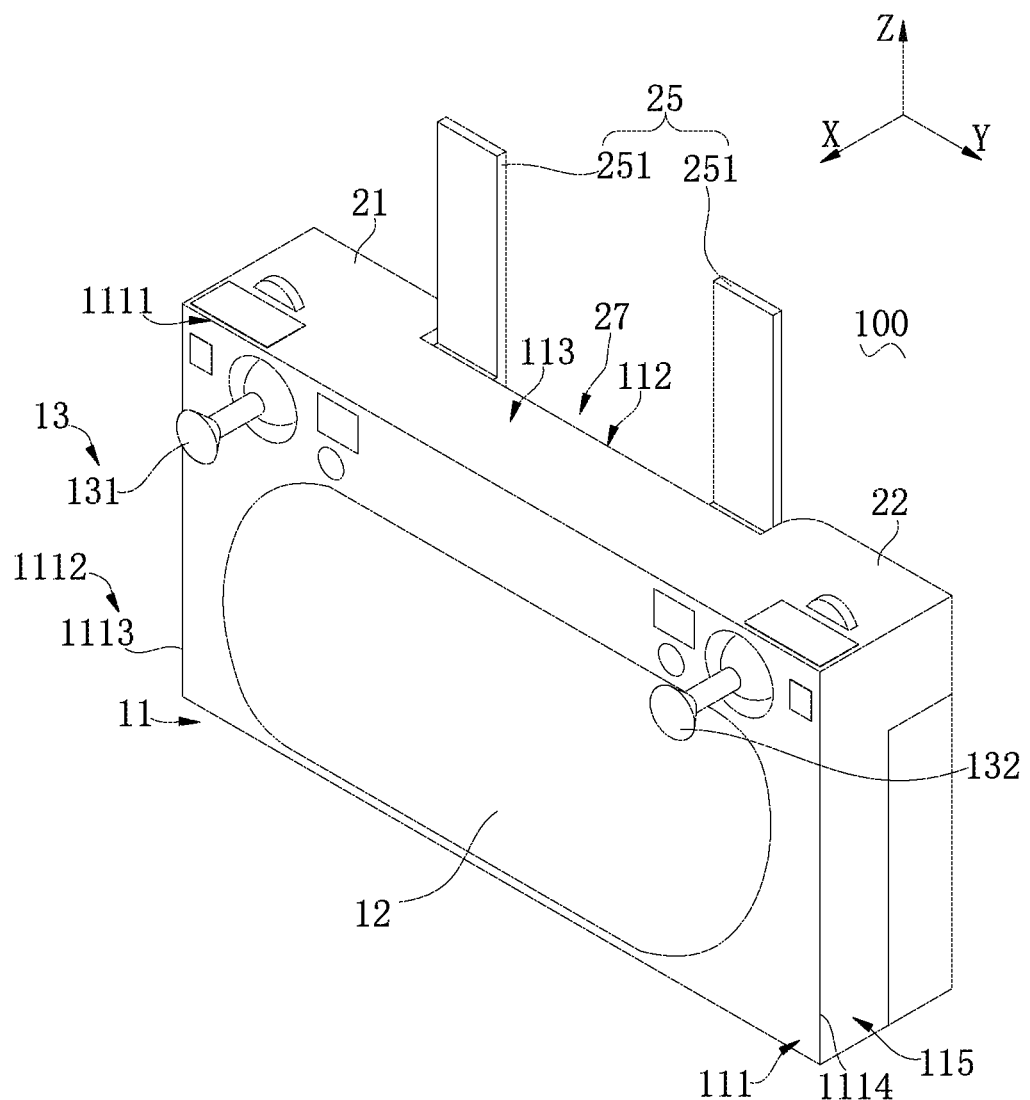
FIG. 6 is a second schematic 3-dimensional diagram of a remote control according to some embodiment of the present disclosure.
Figure 7:
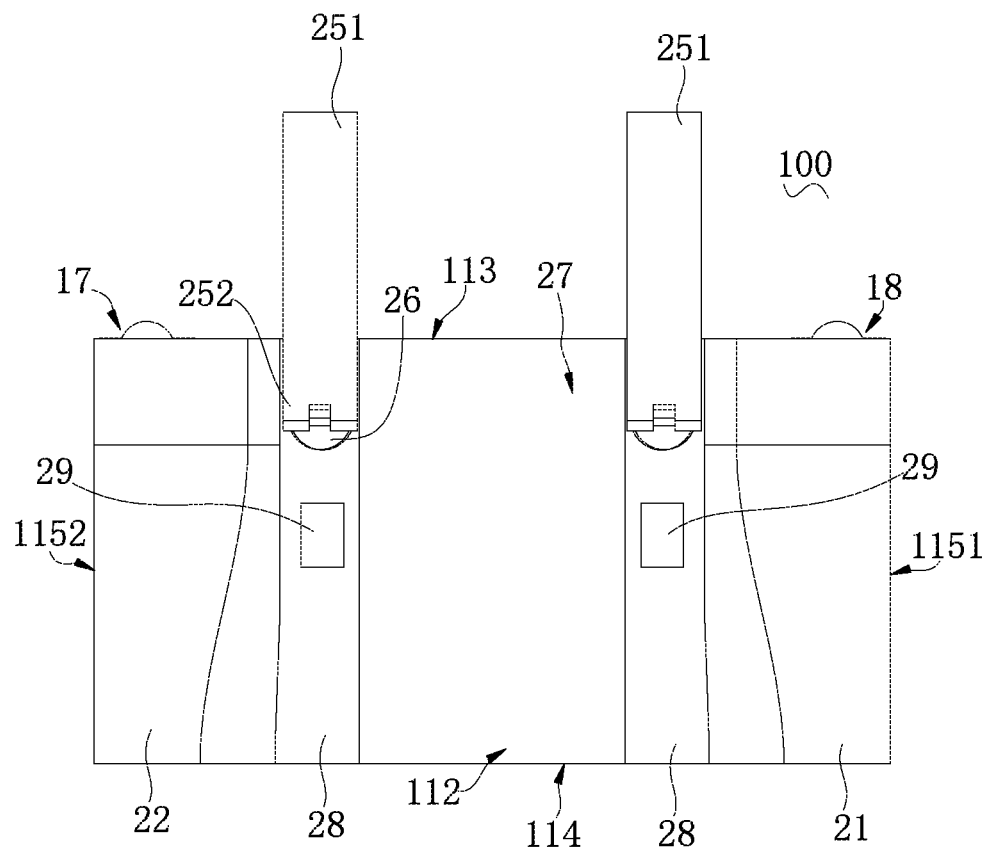
FIG. 7 illustrates a second rear view of a remote control according to some embodiment of the present disclosure.
Figure 8:
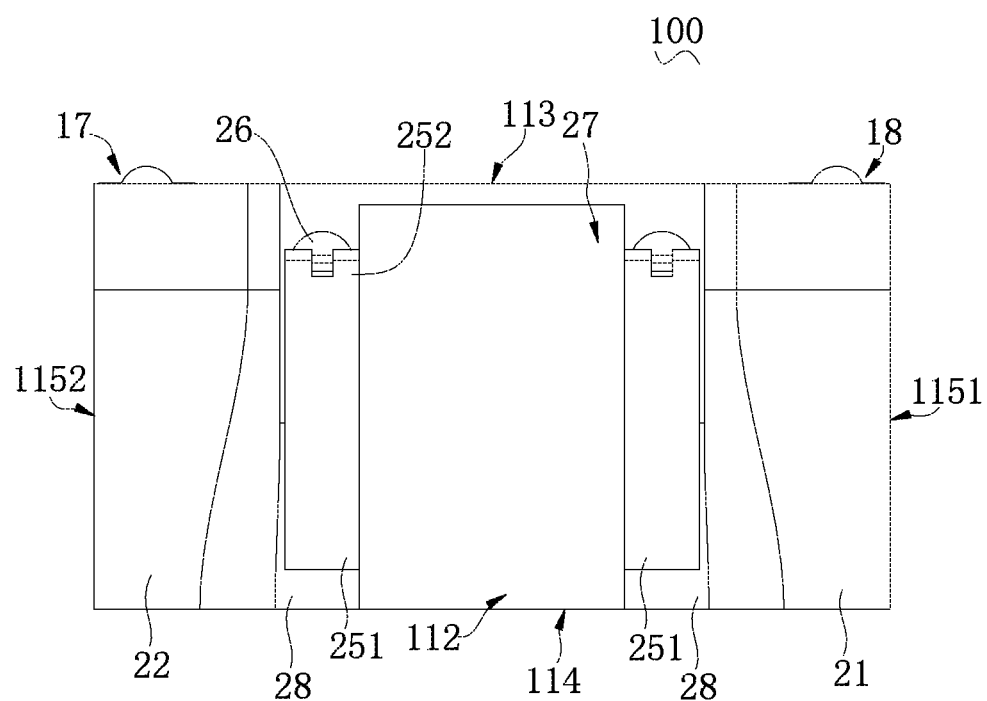
FIG. 8 illustrates a third rear view of a remote control according to some embodiment of the present disclosure.

Referring to FIG. 6 to FIG. 8, a remote control 100 according to some embodiment of the present disclosure includes a body 11 and an antenna 25. The body 11 includes a front 111 and a back 112 opposite to each other. The front 111 is a surface facing the user when the user normally operates the remote control 100. The antenna 25 is disposed on the back 112. The antenna 25 can rotate relative to the body 11 so that the antenna 25 can be in an operating state (as shown in FIGS. 6 and 7) or a storage state (as shown in FIG. 8).

The antenna 25 rotate relative to the body 11. When the antenna 25 is in a storage state, the antenna 25 can fit to the back 112 to reduce an overall size of the remote control 100 and improve the portability of the remote control 100.

Specifically, the remote control 100 communicates with the UAV via the antenna 25 to send instructions to the UAV or receive information such as status parameters sent from the UAV as a feedback and images obtained by the UAV. In order to ensure the communication quality, the antenna 25 needs to protrude from the body 11 when in use, so as to maintain a large distance from surrounding components as much as possible. When the antenna 25 is not in use, the antenna 25 can be rotated so that the antenna 25 can be in the storage state. The remote control 100 can be easily carried in a pocket or a backpack, and the antenna 25 cannot be easily damaged.

Figure 10:
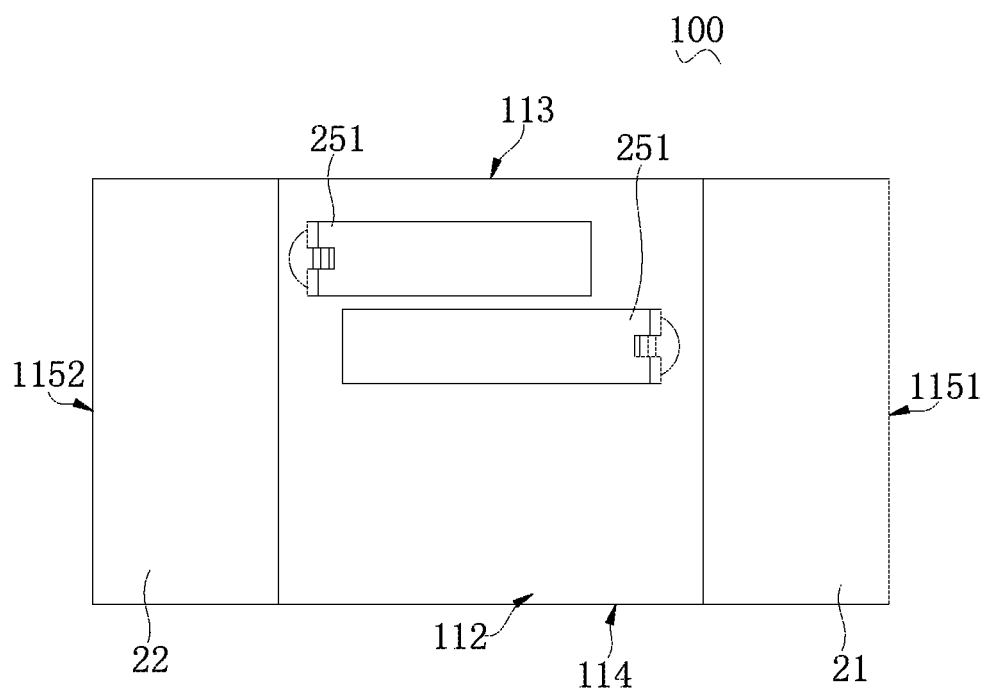
FIG. 10 illustrates a fifth rear view of a remote control according to some embodiment of the present disclosure.
Figure 11:
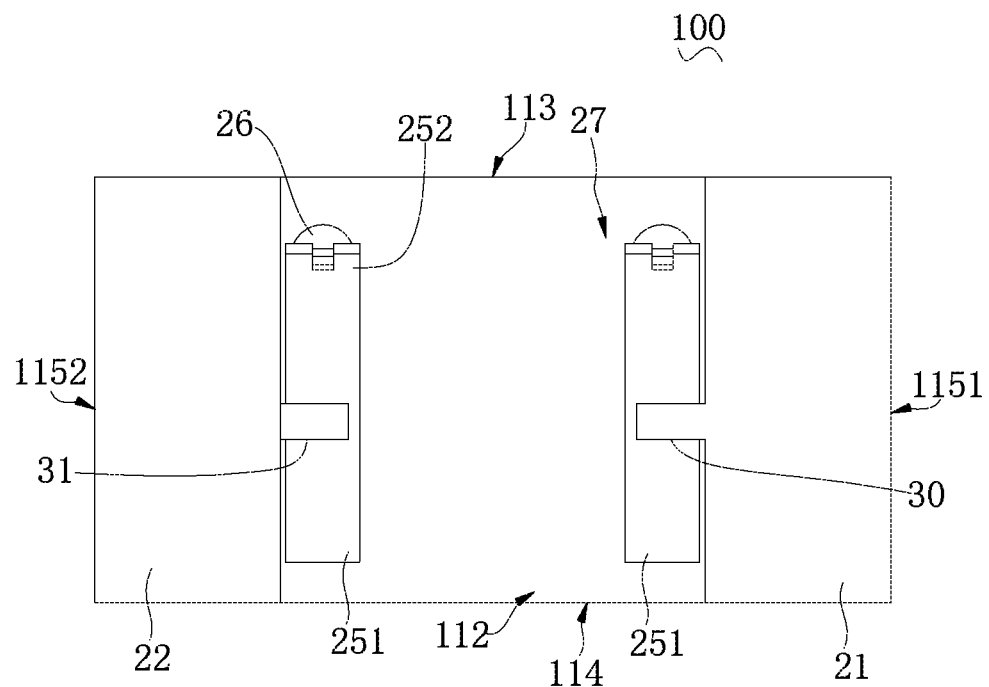
FIG. 11 illustrates a sixth rear view of a remote control according to some embodiment of the present disclosure.

Referring to FIG. 8, FIG. 10, and FIG. 11, in some embodiments, the antenna 25 includes a plurality of sub-antennas 251. When the antenna 25 is in a storage state, the plurality of sub-antennas 251 are parallel to each other.

The antenna 25 includes multiple sub-antennas 251. The multiple sub-antennas 251 may be sub-antennas 251 having the same shape or sub-antennas 251 having different shapes. The multiple sub-antennas 251 are spaced from each other to reduce mutual interference of the sub-antennas 251 during use. When multiple sub-antennas 251 are in use, a direction pointed by the sub-antenna 251 may be a direction from the bottom 114 to the top 113. When the user holds the remote control 100, the communication quality is optimal when the sub-antenna 251 points to a direction of the UAV.

Each of the sub-antennas 251 includes an end portion 252 connected to the body 11, and the end portion 252 and the body 11 are connected by an adapter 26 (such as a hinge or a universal connector) so that each of the sub-antennas 251 can rotate relative to the body 11. The relative rotation between each sub-antenna 251 and the body 11 does not interfere with each other. The adapter 26 can be connected to a location on the back 112 near the top 113, so that the sub-antenna 251 extends relatively long from the top 113 during use which improves the reliability of communication between the remote control 100 and the UAV. It should be noted that the sub-antenna 251 is rotatably connected to the body 11, and the sub-antenna 251 can rotate around multiple axes in multiple directions relative to the body 11. For example, the sub-antenna 251 can rotate around a Y-axis, Z-axis or X-axis as shown in FIG. 6. In the embodiment of the present disclosure, a number of the sub-antennas 251 is two. Of course, in other embodiments, the number of the sub-antennas 251 may be three, four, five, etc.

Referring to FIG. 6 to FIG. 8, in some embodiments, the sub-antenna 251 is a flat cuboid. When the antenna 25 is in the operating state and the storage state, a thickness direction of the sub-antenna 251 is consistent with a direction pointed from the front 111 to the back 112.

When the flat rectangular sub-antenna 251 is in the storage state, the sub-antenna 251 closely fits to the back 112, which further reduces the size of the remote control 100 when the antenna 25 is in the storage state. Further, in the embodiment of the present disclosure, the body 11 is cuboid-shaped as a whole, and a thickness of the body 11 (the distance between the front 111 and the back 112 of the body 11) is small. The thickness direction of the sub-antenna 251 is the same as the direction pointed from the front 111 to the back 112, to avoid increasing a length and a width of the body 11, so that the size of the body 11 in each direction can be uniform.

Figure 9:
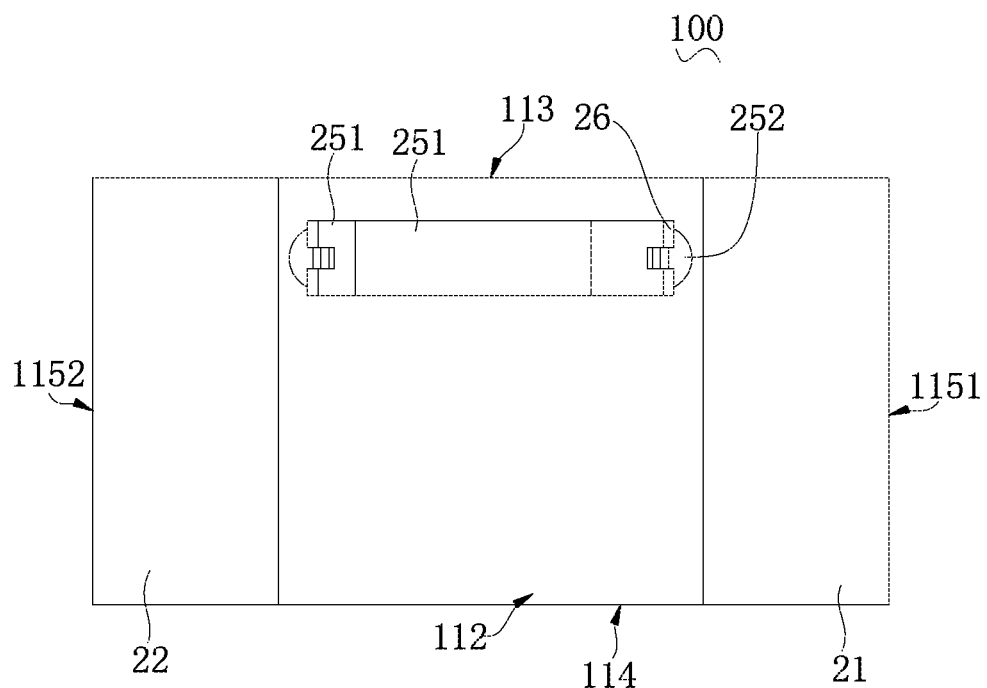
FIG. 9 illustrates a fourth rear view of a remote control according to some embodiment of the present disclosure.

Referring to FIG. 9 and FIG. 10, in some embodiments, when the multiple sub-antennas 251 are in the storage state, the multiple sub-antennas 251 are stacked in a direction perpendicular to the back 112 (as shown in FIG. 9). Or, when the multiple sub-antennas 251 are in the storage state, the multiple sub-antennas 251 are stacked in a direction perpendicular to the top 113 (as shown in FIG. 10).

The plurality of sub-antennas 251 are relatively compact in the storage state, which facilitates the carrying of the remote control 100.

Referring to FIG. 6, in some embodiments, the body 11 further includes a side 115. The front 111 includes an upper edge 1111 and a side edge 1112 that intersect with each other. The upper edge 1111 intersects with the top 113, and the side edge 1112 intersects with the side 115. The remote control 100 further includes a touch screen 12 and an operating lever 13. The touch screen 12 is disposed on the front 111, the operating lever 13 is disposed on the front 111, and the operating lever 13 is located near the upper edge 1111 and the side edge 1112.

The position of the operating lever 13 is reasonable, which is convenient for the user to hold the remote control 100 to operate the operating lever 13, and view the touch screen 12 and operate on the touch screen 12 at the same time. The user can operate the remote control 100 more conveniently and comfortably.

Specifically, referring to FIG. 6 and FIG. 7, in some embodiments, the side 115 includes a left side 1151 and a right side 1152. The edges include a left edge 1113 and a right edge 1114. The left edge 1113 intersects with the left side 1151, and the right edge 1114 intersects with the right side 1152. The operating lever 13 includes a left operating lever 131 and a right operating lever 132. The left operating lever 131 is near the left edge 1113, and the right operating lever 132 is near the right edge 1114.

Referring to FIG. 7, in some embodiments, the remote control 100 further includes a left handle 21 and a right handle 22 protruding from the back 112. The left handle 21 is opposite to the left operating lever 131, and the right handle 22 is opposite to the right operating lever 132. A storage space 27 is formed between the left grip 21 and the right grip 22, and the antenna 25 is located in the storage space 27 when the antenna 25 is in the storage state.

The left grip 21 and the right grip 22 protruding from the back 112 facilitate the holding of the remote control 100 by the user. In one example, when the user holds the remote control 100, the user's middle finger, ring finger, and little finger all hold the side wall of the left grip 21 or the right grip 22. Accordingly, when the user operates the remote control 100, the grip can be stable and comfortable. Further, a non-slip mat may be further disposed on the surface of the left grip 21 or the right grip 22, or the surfaces of the left grip 21 and the right grip 22 may be roughened to reduce the chance of the user's slipping of the remote control 100 during use.

In addition, in the embodiments of the present disclosure, the heights of the left grips 21 and the right grip 22 protrude from the back 112 (e.g., the heights of the left grip 21 and the right grip 22 along a direction from the front 111 to the back 112) are both greater than the thickness of the antenna 25. That is, when the antenna 25 is in the storage state and is stored in the storage space 27, the thickness of the antenna 25 will not exceed the height of the left grip 21 or the height of the right grip 22, and the antenna 25 will not increase the overall thickness of the remote control 100. The structure of the remote control 100 is relatively compact and it is easy to carry the remote control.

Figure 12:
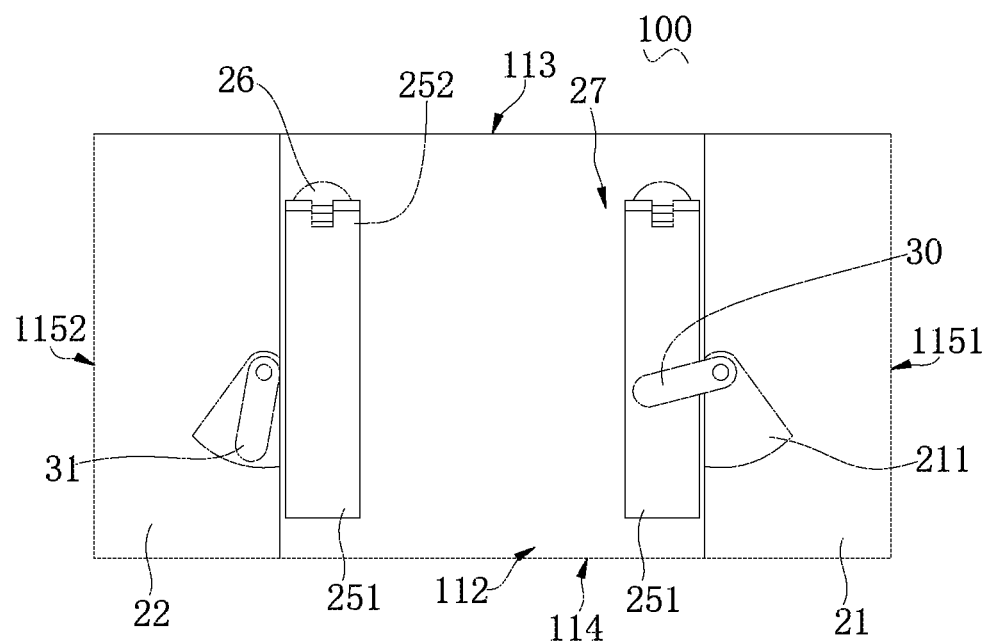
FIG. 12 illustrates a seventh rear view of a remote control according to some embodiment of the present disclosure.

Referring to FIGS. 11 and 12, in some embodiments, the remote control 100 may further include a left fixing member 30 disposed on the left handle 21 and a right fixing member 31 disposed on the right handle 22. The number of the sub-antennas 251 is two. When two sub-antennas 251 is in the storage state, the left fixing member 30 is configured to restrict one sub-antenna 251 from moving in a direction perpendicular to the back 112, and the right fixing member 31 is configured to restrict the other sub-antenna 251 from moving in a direction perpendicular to the back 112.

The left fixing member 30 and the right fixing member 31 may be configured to restrict the movement of the antenna 25 from moving in a direction perpendicular to the back 112. When the user carries the remote control 100, the sub-antenna 251 cannot be easily removed from the storage space 27.

Specifically, in some embodiments, the left fixing member 30 is connected to the left handle 21, and the right fixing member 31 is connected to the right handle 22 (as shown in FIG. 11). Or, the left fixing member 30 is rotatably connected to the left handle 21, and the left fixing member 30 can rotate relative to the left handle 21 to abut against a sub-antenna 251. The right fixing member 31 is rotatably connected to the right handle 22, and the right fixing member 31 can rotate relative to the right grip 22 to abut against another sub-antenna 251 (as shown in FIG. 12).

Referring to FIG. 11, in some embodiments, one end of the left fixing member 30 is connected to the left grip 21, and the other end extends into the storage space 27. A certain gap is formed between the left fixing member 30 and the back 112. When the antenna 251 is in the storage state, the sub-antenna 251 can be stored in the gaps. At this time, due to the limiting effect of the left fixing member 30, the sub-antenna 251 cannot move in a direction perpendicular to the back 112, thereby reducing the possibility that the sub-antenna 251 is turned out of the storage space 27 during the carrying of the remote control 100. When it is necessary to rotate the sub-antenna 251 to the operating state, the sub-antenna 251 may rotate in a direction parallel to the back 112 first, so that the sub-antenna 251 is turned out of the gap, and then the sub-antenna 251 is further rotated so that it can be in the operating state. When the sub-antenna 251 needs to be rotated to the storage state again, the sub-antenna 251 can be rotated to fit the back 112 first, and then the sub-antenna 251 is rotated in a direction parallel to the back 112 to turn the sub-antenna 251 into the gap.

Referring to FIG. 12, in another example, a fan-shaped turning groove 211 is disposed in the left grip 21, the left fixing member 30 is rotatably connected to the left grip 21, and the left fixing member 30 can rotate into the fan-shaped turning groove 211, or rotate into the storage space. When the sub-antenna 251 is in the storage state, the left fixing member 30 can be rotated into the storage space to abut against the sub-antenna 251 and restrict the sub-antenna 251 from moving in a direction perpendicular to the back 112. When the sub-antenna 251 is needed, the left fixing member 30 may be rotated the turning groove 211, and the sub-antenna 251 is further rotated so that the sub-antenna 251 can be in an operating state.

Of course, in other embodiments, there may be other ways to connect the left fixing member 30 and the left handle 21. For example, the left fixing member 30 may be slidably connected to the left handle 21, and the left fixing member 30 may slide into the storage space 27 to restrict the sub-antenna 251 from moving in a direction perpendicular to the back 112, or slide into the left grip 21. It can be understood that the structure and principle of the right fixing member 31 restricting the sub-antenna 251 from moving in a direction perpendicular to the back 112 are similar to those of the left fixing member 30, and details are not described herein again.

Referring to FIG. 6 to FIG. 8, in some embodiments, the antenna 25 further includes a storage slot 28 disposed on the back 112. When the antenna 25 is in the storage state, the antenna 25 can be stored in the storage slot 28.

The shape of the storage slot 28 may be the same as the shape of the antenna 25. When the antenna 25 is stored in the storage slot 28, the overall size of the remote control 100 can be further reduced.

Referring to FIG. 6 to FIG. 8, in some embodiments, the remote control 100 further includes a fixing bracket 29 disposed in the storage slot 28. The fixing bracket 29 is configured to fix the antenna 25 to be in the storage slot 28.

The fixing bracket 29 can be configured to prevent the antenna 25 from coming out of the storage slot 28 due to vibration, etc., when the antenna 25 is stored in the storage slot 28. Specifically, the fixing bracket 29 may be configured to fix the antenna 25 by using a magnet, or the fixing bracket 29 may be configured to fix the antenna 25 by using a snap-fit.

Figure 13:
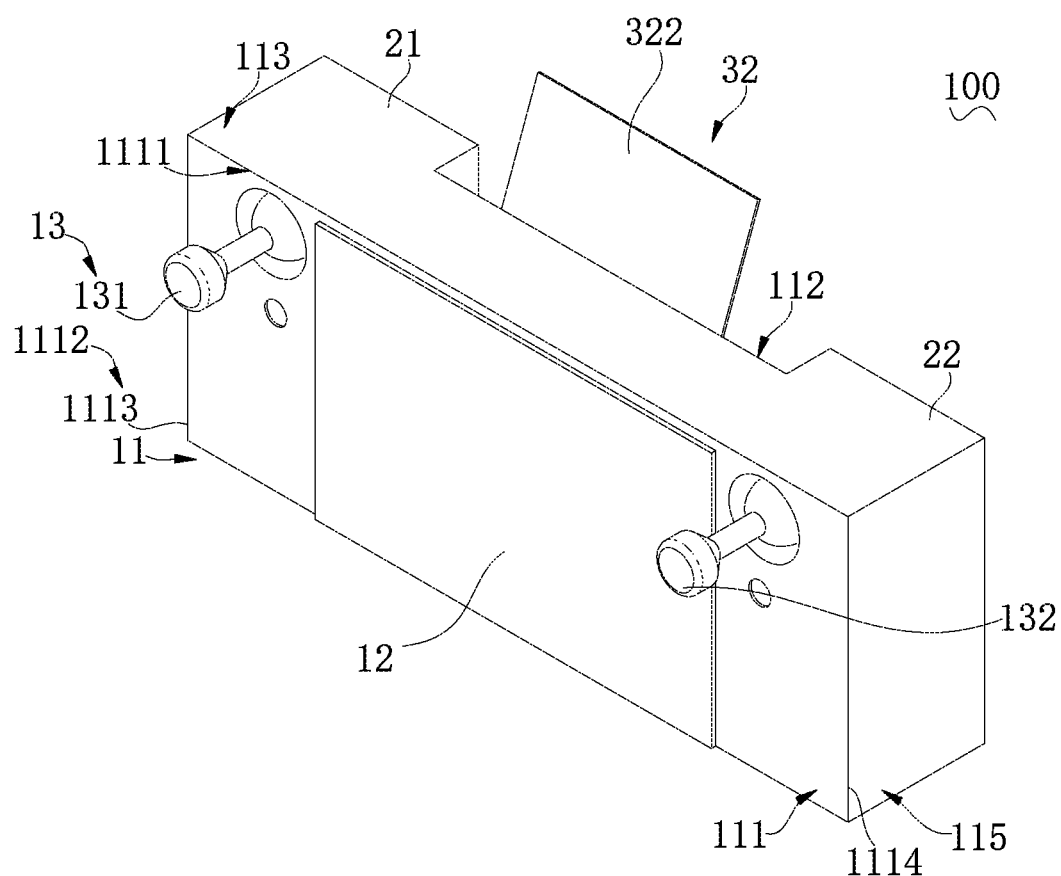
FIG. 13 is a third schematic 3-dimensional diagram of a remote control according to some embodiment of the present disclosure.
Figure 14:
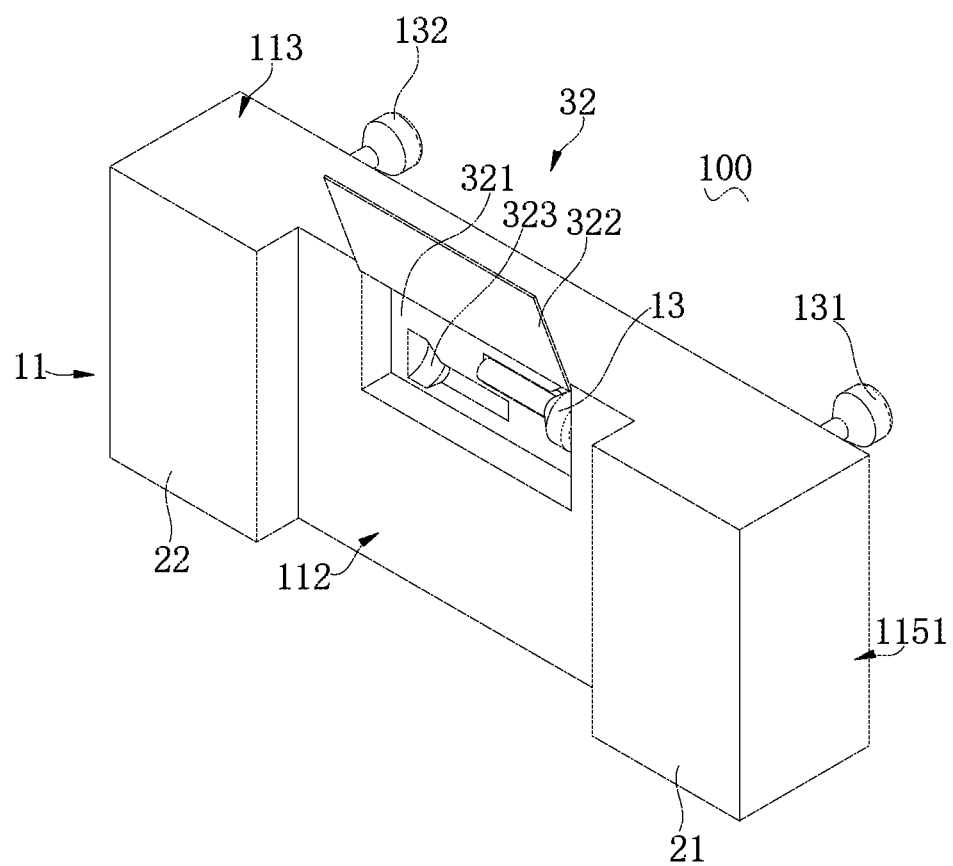
FIG. 14 is a fourth schematic 3-dimensional diagram of a remote control according to some embodiment of the present disclosure.
Figure 15:
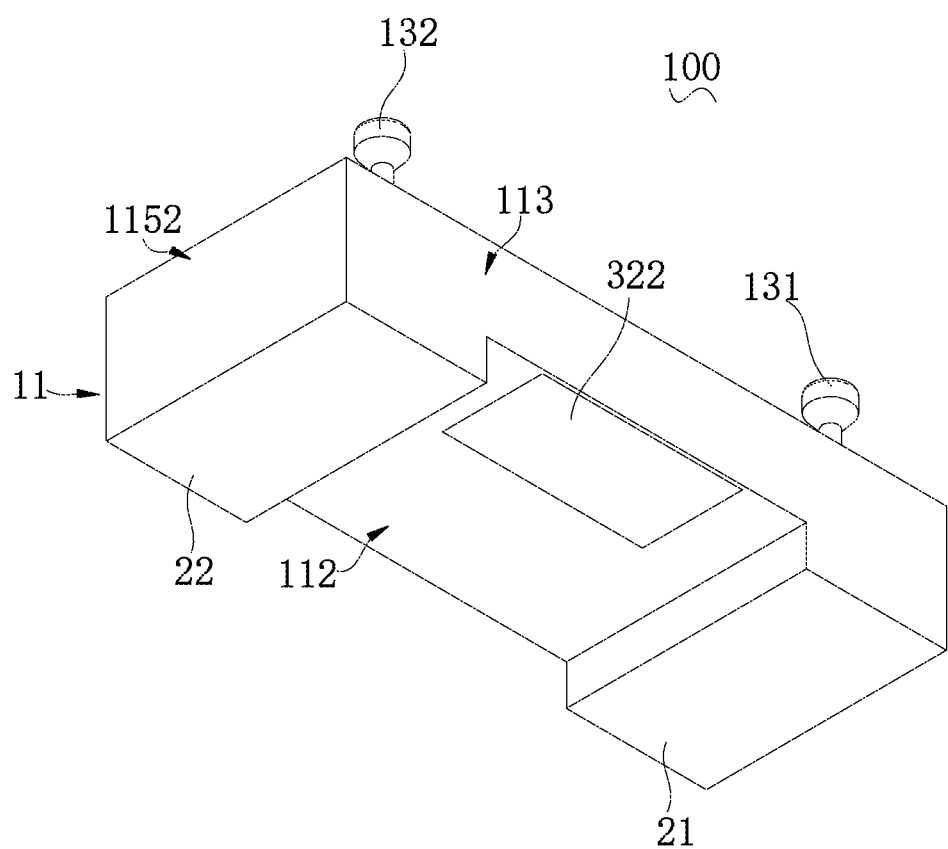
FIG. 15 is a fifth schematic 3-dimensional diagram of a remote control according to some embodiment of the present disclosure.

Referring to FIG. 13 to FIG. 15, the remote control 100 according to the embodiments of the present disclosure includes a body 11, an operating lever 13, and a storage box 32. The body 11 is formed with a front 111 and a back 112 opposite to each other. The front 111 is a surface facing the user when the user normally operates the remote control 100. The operating lever 13 is disposed in the front 111, and the operating lever 13 is detachably connected to the body 11. The storage box 32 is disposed on the back 112, and the storage box 32 is configured to store the detached operating lever 13.

When the user does not need to use the operating lever 13 or needs to carry the remote control 100, the operating lever 13 can be detached from the body 11 and stored in the storage box 32 to reduce the overall size of the remote control 100 and improve the portability of the remote control 100.

Figure 16:
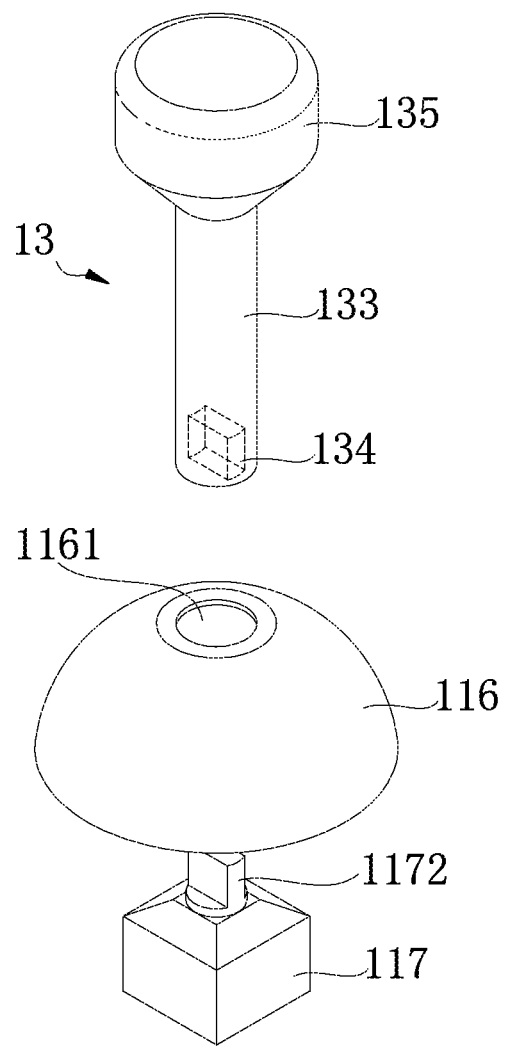
FIG. 16 illustrates an exploded 3-dimensional view of an operating lever, a protective cover, and a potentiometer according to some embodiment of the present disclosure.

Referring to FIG. 13 and FIG. 16, in some embodiments, the body 11 includes a protective cover 116 and a potentiometer 117. The operating lever 13 passes through the protective cover 116 and is detachably connected to the potentiometer 117.

Specifically, the operating lever 13 includes a main body 133. A connecting portion 134 is disposed at one end of the main body 133, and an operating portion 135 is disposed at the other end. The main body 133 and the connecting portion 134 can rotate by user's turning of the operating portion 135. The main body 133 may be in the shape of a cylindrical rod, or in the shape of a cuboid, a hexagonal prism, an octagonal prism, etc. The operating portion 135 may be cylindrical, etc. The protective cover 116 can be in the shape of a spherical cap. The protective cover 116 may be configured to protect the potentiometer 117 from the interference of the dust, water vapor etc. A through hole 1161 is disposed in the protective cover 116. A part of the main body 133 and the connecting portion 134 pass through the through hole 1161 so as to be detachably connected to the potentiometer 117.

When the user moves the operating lever 13 to drive the potentiometer 117 to rotate, the potentiometer 117 generates different electrical signals according to different directions of rotation, to receive the user's input operation. The operating lever 13 may be connected to the potentiometer 117 by one of: screw connection, button connection, bolted joint connection and pin connection. In the embodiment of the present disclosure, the connecting portion 134 is a mounting hole disposed at one end of the main body 133. A mounting shaft 1172 having the same shape as the mounting hole is formed on the potentiometer 117. The mounting hole fits the mounting shaft 1172 to mount the operating lever 13 on the potentiometer 117. When the operating lever 13 needs to be dissembled, the operating lever 13 is pulled out to disengage the mounting hole from the mounting shaft 1172.

Referring to FIG. 14, in some embodiments, the storage box 32 includes a storage slot 321 and a box cover 322 which are disposed on the back 112. The storage slot 321 is configured to receive the detached operating lever 13, and the box cover 322 is configured to cover the storage slot 321 to prevent the operating lever 13 from falling out of the storage slot 321.

When the operating lever 13 is in use and has not been detached, the box cover 322 covers the storage slot 321 (as shown in FIG. 15), and the storage slot 321 is not exposed to affect the appearance of the remote control 100. When the operating lever 13 is detached and stored in the storage slot 321, the box cover 322 can also prevent the operating lever 13 from falling out of the storage slot 321 so as to avoid losing the operating lever 13.

Specifically, referring to FIG. 14, in some embodiments, the box cover 322 is rotatably connected to the body 11, and the box cover 322 rotates relative to the body 11 to open or cover the storage slot 321. Alternatively, the box cover 322 is slidably connected to the body 11, and the box cover 322 slides relative to the body 11 to open or cover the storage slot 321. Alternatively, the box cover 322 is connected to the body 11 by a card slot, and the box cover 322 is inserted into the body 11 to cover the storage slot 321.

Referring to FIG. 14, in some embodiments, the operating lever 13 is fixed in the storage slot 321 by a magnet. At least one of the operating lever 13 or the storage slot 321 is magnetic. When the operating lever 13 is stored in the storage slot 321, the operating lever 13 is attracted to the storage slot 321, and the fixing method of the operating lever 13 is simple.

In some embodiments, the operating lever 13 is fixed in the storage slot 321 by a snap-fitting manner. Specifically, a snap may be formed in the storage slot 321, and the operating lever 13 may be used as a snap as a whole. The operating lever 13 is pressed or the operation lever 13 is locked in the snap.

Referring to FIG. 14 and FIG. 15, in some embodiments, when the operating lever 13 is stored in the storage slot 321, the box cover 322 abuts against the operating lever 13 to fix the operation lever 13 in the storage slot 321. Specifically, since the box cover 322 is connected to the body 11 when covering the receiving groove 321, the box cover 322 abuts against the operating lever 13 and hold the operation lever 13 in the storage slot 321.

Referring to FIG. 14, in some embodiments, the storage box 32 further includes a groove 323 provided at a bottom of the storage slot 321. The shape of the groove 323 is consistent with the shape of the operating lever 13, so that the operating lever fits the groove 323 to store the operating lever in the storage box 32.

The shape of the groove 323 is consistent with the shape of the operating lever 13, so that the operating lever can fit the groove 323 to store the operating lever in the storage box 32. Specifically, a size of the groove 323 may be slightly smaller than a size of the operating lever 13 such that the fitting of the operating lever 13 to the groove 323 is an interference fit, and the operating lever 13 cannot fall easily. When the operating lever 13 needs to be taken out, a little force may be used to separate the operating lever 13 from the groove 323, and the fixing method of the operating lever 13 is simple.

Referring to FIGS. 13-15, in some embodiments, the body 11 is further formed with a side 115. The front 111 includes an upper edge 1111 and a side edge 1112 that intersect with each other. The upper edge 1111 intersects with the top 113, and the side edge 1112 and the side 115 intersect with each other. The remote control 100 further includes a touch screen 12. The touch screen 12 is disposed on the front 111, and the operating lever 13 is located near the upper edge 1111 and the side edge 1112.

The position of the operating lever 13 is reasonable, which facilitates the holding of the remote control 100 by the user to operate the operating lever 13 and to view the touch screen 12 and operate on the touch screen 12 at the same time. The user can operate the remote control 100 more conveniently and comfortably.

Specifically, referring to FIG. 13 to FIG. 15, in some embodiments, the side 115 includes a left side 1151 and a right side 1152. The edges include a left edge 1113 and a right edge 1114, and the left edge 1113 intersects with the left side 1151. The right edge 1114 intersects with the right side 1152. The operating lever 13 includes a left operating lever 131 and a right operating lever 132. The left operating lever 131 is near the left edge 1113, and the right operating lever 132 is near the right edge 1114.

Referring to FIG. 13 to FIG. 15, in some embodiments, the remote control 100 further includes a left grip 21 and a right grip 22 protruding from the back 112. The left grip 21 is opposite to the left operating lever 131, and the right grip 22 is opposite to the right operating lever 132. A storage box 32 disposed between the left grip 21 and the right grip 22.

The left grip 21 and the right grip 22 protruding on the back 112 facilitate the holding of the remote control 100 by the user. The storage box 32 is disposed between the left handle 21 and the right handle 22, making full use of the space between the left handle 21 and the right handle 22, so that the storage box 32 does not increase the overall size of the remote control 100.

Referring to FIGS. 14 and 15, in some embodiments, the storage box 32 protrudes at least partially from the back 112, and the height of the storage box 32 protruding from the back 112 is lower than either of the height of the left grip 21 and the height of the right grip 22. Alternatively, the storage box 32 is formed between the front 111 and the back 112.

That is, the storage box 32 does not increase the thickness of the remote controller 100, and the overall size of the remote control 100 is relatively compact. Of course, in other embodiments, the storage box 32 may be disposed in the left grip 21 or the right grip 22.

In the description of this specification, the description with reference to the terms "certain embodiments", "one embodiment", "some embodiments", "examples", "specific examples", or "some examples", etc., means that the implementation is combined with specific features, structures, materials, or characteristics described in the embodiments or examples are included in at least one embodiment or example of the present disclosure. In this specification, the schematic expressions of the above terms are not necessarily directed to the same embodiment or example. Furthermore, the particular features, structures, materials, or characteristics described may be combined in any suitable manner in any one or more embodiments or examples. In addition, when no conflicts exist, those skilled in the art may combine different embodiments or examples and features of the different embodiments or examples described in this specification.

In addition, the terms "first" and "second" are used for descriptive purposes only and cannot be understood as indicating or implying relative importance or implicitly indicating the number of technical features indicated. Therefore, the features defined as "first" and "second" may explicitly or implicitly include at least one of the described features. In the description of the present disclosure, the meaning of "plurality" is at least two, e.g., two, three, unless specifically defined otherwise.

Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

What is claimed is:

1. A remote control, comprising:
   a body with a front, a top, and a side, the front comprising an upper edge and a side edge intersecting with the upper edge, the upper edge intersecting with the top, and the side edge intersecting with the side;
   a touch screen disposed at the front;
   an operating lever disposed at the front, and the operating lever being located near the upper edge and the side edge; and
   a GPS disposed in the body, wherein:
   the operating lever comprises a left operating lever and a right operating lever;
   the left operating lever and the right operating lever are located between the touch screen and the upper edge; and
   an orthographic projection of the GPS at the front is located between the touch screen and the upper edge.

2. The remote control according to claim 1, wherein:
   the body comprises a left side and a right side, the left edge being opposite to the left side; a left edge and a right edge, the right edge intersecting with the right side; and
   the left operating lever is near the left edge, and the right operating lever is near the right edge.

3. The remote control according to claim 2, wherein:
   a through hole is disposed in the touch screen, and the left operating lever and the right operating lever pass through the through hole.

4. The remote control according to claim 2, wherein an orthographic projection of the GPS at the front is located between the left operating lever and the right operating lever.

5. The remote control according to claim 2, further comprising:
   a middle button disposed at the front, the middle button being located between the left operating lever and the right operating lever and between the touch screen and the upper edge; or
   a through hole disposed in the touch screen, and the middle button being disposed in the through hole.

6. The remote control according to claim 2, wherein the remote control comprises:
   a left custom button and a right custom button disposed at the front,
   the left custom button being located between the left operating lever and the left edge, and the right custom button being located between the right operating lever and the right edge.

7. The remote control according to claim 6, further comprising:
   one or more function buttons being configured to be in different operating modes to switch among different control objects;
   in response to the one or more function buttons being triggered simultaneously, the left custom button being configured to switch the one or more function buttons to different operating modes; and
   in response to the one or more function buttons being triggered simultaneously, the right custom button being configured to switch the one or more function buttons to different operating modes; wherein:
   the different operating modes include switching a motion mode of the UAV, locking the remote control, starting the UAV, and adjusting a sensitivity of the operating lever.

8. The remote control according to claim 2, further comprising:
   a left top button and a right top button disposed on the top, the left top button corresponding to the left operating lever, and the right top button corresponding to the right operating lever.

9. The remote control according to claim 8, wherein:
   the left top button comprises:
   a video button configured to control a camera carried by the UAV to perform video recording, and
   a camera control button configured to adjust a focal length and exposure of the camera; and
   the top right button comprises:
   a photo button configured to control the camera to take pictures, the camera being mounted on the UAV by a gimbal; and
   a gimbal adjustment button configured to control a rotation of the gimbal; or
   the top right button comprises:
   a video button configured to control a camera carried by the UAV to perform video recording, and
   a camera control button configured to adjust a focal length and exposure of the camera; and
   the top left button comprises:
   a photo button configured to control the camera to take pictures, the camera being mounted on the UAV by a gimbal; and
   a gimbal adjustment button configured to control a rotation of the gimbal;
   wherein:
   the camera control button is a trackwheel, and scrolls to steplessly adjust the focal length and exposure of the camera, or adjust the focal length and exposure of the camera in steps; and
   the gimbal adjustment button is a trackwheel, and scrolls to steplessly adjust the rotation of the gimbal or adjust the rotation of the gimbal in steps.

10. The remote control according to claim 2, further comprising:
    one or more interfaces disposed on the body and configured to be connected to an external device for transmitting data and charging the remote control, the one or more interfaces being disposed on the top or a bottom opposite the top.

11. The remote control according to claim 2, further comprising:

a back opposite the front,
a protrusion protruding from the back, and
a left grip and a right grip spaced from each other, the left grip corresponding to the left operating lever, and the right grip corresponding to the right operating lever.

12. The remote control according to claim 11, wherein:
the body is formed with a bottom opposite the top; and
a width of the left grip decreases along a direction from the top to the bottom, and a width of the right grip gradually decreases along a direction from the top to the bottom.

13. The remote control according to claim 2, further comprising:
a bottom opposite the top,
a bottom heat dissipation port disposed at the bottom, the bottom heat dissipation port being connected to an outside environment and an inside of the body; wherein:
the remote control transmits sound from the bottom heat dissipation port.

14. The remote control according to claim 2, further comprising:
a storage slot disposed in a back opposite the front; and
a left grip and a right grip protruding from the back, the left grip corresponding to the left operating lever, the right grip corresponding to the right operating lever, a storage space being formed between the left grip and the right grip, and an antenna being located in the storage slot when the antenna is in a storage state.

15. The remote control according to claim 2, further comprising:
a fixing bracket disposed in the storage slot configured to fix the antenna in the storage slot by magnet attraction or snap-fitting; wherein:
the antenna comprises:
a plurality of sub-antennas, the plurality of sub-antennas being parallel to each other when the antenna is in the storage state.

16. The remote control according to claim 15, wherein:
the sub-antenna is a rectangular cuboid; and
when the antenna being in an operating state or a storage state, a thickness direction of the sub-antenna is a direction from the front to the back.

17. The remote control according to claim 2, wherein the body comprises:
a protective cover and a potentiometer, the operating lever passing through the protective cover and being detachably connected to the potentiometer.

18. The remote control according to claim 2, further comprising:
a left grip and a right grip protruding from the back, the left grip being opposite to the left operating lever, the right grip being opposite to the right operating lever, and the storage box being disposed between the left grip and the right grip; wherein:
the left operating lever is connected to the potentiometer by one of: a screw connection, a button connection, a bolted joint connection, and a pin connection; and
the right operating lever is connected to the potentiometer by one of: a screw connection, a button connection, a bolted joint connection, and a pin connection.

19. The remote control according to claim 18, wherein:
the storage box projects at least partially from the back, and a height of the storage box protruding from the back is lower than either of a height of the left grip or a height of the right grip protruding from the back; or
the storage box is formed between the front and the back.

20. The remote control according to claim 2, wherein:
a box cover is rotatably connected to the body, and the box cover rotates relative to the body to open or cover a storage slot; or
the box cover is slidably connected to the body, and the box cover slides relative to the body to open or cover the storage slot; or
the box cover slides onto the body to cover the storage slot.

* * * * *